US008047473B2

(12) United States Patent
Johnson et al.

(10) Patent No.: US 8,047,473 B2
(45) Date of Patent: Nov. 1, 2011

(54) CONNECTING NODE AND METHOD FOR CONSTRUCTING A CONNECTING NODE

(75) Inventors: Christopher J. Johnson, Houston, TX (US); Jasen L. Raboin, League City, TX (US); Gary R. Spexarth, Houston, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 468 days.

(21) Appl. No.: 12/240,537

(22) Filed: Sep. 29, 2008

(65) Prior Publication Data
US 2010/0077674 A1 Apr. 1, 2010

(51) Int. Cl.
*B64G 1/00* (2006.01)
(52) U.S. Cl. ............ 244/159.4; 244/172.4; 403/171; 403/176
(58) Field of Classification Search ......... 403/169, 403/170, 171, 176, 217, 218; 244/158.3, 244/159.4, 159.5, 172.4; 119/221, 474, 498, 119/499; 482/35, 36
See application file for complete search history.

(56) References Cited

U.S. PATENT DOCUMENTS

| | | | | | |
|---|---|---|---|---|---|
| 3,632,109 | A | * | 1/1972 | Dattner | 482/35 |
| 3,955,328 | A | * | 5/1976 | Lindsay | 52/73 |
| 3,970,301 | A | | 7/1976 | Lehmann | |
| 4,057,207 | A | * | 11/1977 | Hogan | 244/159.4 |
| 4,701,131 | A | | 10/1987 | Hildebrandt et al. | |
| 4,715,566 | A | * | 12/1987 | Nobles | 244/159.4 |
| 4,872,625 | A | * | 10/1989 | Filley | 244/159.4 |
| 5,253,799 | A | | 10/1993 | Sebesta | |
| 5,448,868 | A | | 9/1995 | Lalvani | |
| 5,618,246 | A | * | 4/1997 | Zheng | 482/35 |
| 5,623,790 | A | | 4/1997 | Lalvani | |
| 7,713,060 | B1 | * | 5/2010 | Ichino | 403/171 |
| 7,926,225 | B2 | * | 4/2011 | Pedretti | 403/176 |
| 2004/0144041 | A1 | | 7/2004 | Fleishman | |

* cited by examiner

*Primary Examiner* — Michael P Ferguson
(74) *Attorney, Agent, or Firm* — Kurt G. Hammerle

(57) ABSTRACT

A connecting node comprises a polyhedral structure comprising a plurality of panels joined together at its side edges to form a spherical approximation, wherein at least one of the plurality of panels comprises a faceted surface being constructed with a passage for integrating with one of a plurality of elements comprising a docking port, a hatch, and a window that is attached to the connecting node. A method for manufacturing a connecting node comprises the steps of providing a plurality of panels, connecting the plurality of panels to form a spherical approximation, wherein each edge of each panel of the plurality is joined to another edge of another panel, and constructing at least one of the plurality of panels to include a passage for integrating at least one of a plurality of elements that may be attached to the connecting node.

8 Claims, 4 Drawing Sheets

CONNECTING NODE AND METHOD FOR CONSTRUCTING A CONNECTING NODE

ORIGIN OF THE INVENTION

The invention described herein was made by employees of the United States Government and may be manufactured and used by or for the Government of the United States of America for governmental purposes without the payment of any royalties thereon or therefor.

BACKGROUND

1. Field of Invention

The invention described herein relates generally to space structures and more particularly to a connecting node for docking or connecting other components of a space system.

2. Description of the Related Art

A connecting node is a type of space module used in space systems, such as on the International Space Station (ISS). Current connecting nodes in the related art are limited of curved surfaces joined together to form a spherical metallic solid. Connecting nodes may be constructed of, for example, aluminum and other metals. Typically, connecting nodes serve as a passageway for the transfer of objects, as a connecting apparatus that can be used to connect expandable living and working areas in space, and/or as an airlock. Connecting nodes provide a relatively large volume for storage, containment, human habitation, shelter, or work, as well as for space flight. Connecting nodes typically include hatches that serve as docking ports for the joining of other modules to the connecting node.

FIG. 1 shows a conventional connecting node 100 known in the related art. The node 100 includes a spherical body 102 and several ports such as ports 104, 106, 108, and 110. These ports 104, 106, 108, 110 may be used as a docking station or hatch to attach external space systems to the node 100. As shown in FIG. 1, various curved, spherical portions of the node 100 have been modified to support the integration of docking ports and windows. For instance, the top and bottom portions of the connecting node have been re-shaped to include Port 3 108 and Port 4 (110), resulting in additional flat portions of the spherical body 102. When docking ports 104, 106, 108, 110 and other add-on structures are built into the node 100, the ports 104, 106, 108, 110 are often recessed into the node, requiring a connecting element to be in close proximity to the node 100 to attach to the ports 104, 106.

Construction of connecting nodes such as that shown in FIG. 1 often requires elaborate tooling and processes for manufacturing individual structural panels. Complex manufacturing processes such as plasma welding machines and other unique assembly tools are often employed to bend, cut, and transform the curved surfaces of the nodes to support add-on structures such as docking ports, pass-throughs, and other external systems. For the connecting node of FIG. 1, the spherical body 102 of the node 100 is actually cut and flattened to integrate the ports 104, 106, 108, 110. Thus, the original spherical shape is changed substantially, resulting in complex shapes within the generally spherical node that may cause a loss of interior volume.

SUMMARY

In accordance with an exemplary embodiment of the invention, a connecting node comprises a polyhedron having a plurality of faceted surfaces or panels configured to be connected in a spherical approximation, such as an Archimedean solid known as the great rhombicuboctahedron, which has 12 regular square-shaped faces, 8 regular hexagonal-shaped faces, 6 regular octagonal-shaped faces, 48 vertices, and 72 edges. Each edge of each of the plurality of panels is connected to another edge of another of the plurality of panels, wherein at least one of the plurality of panels is a solid surface configured with a passage to integrate with one of a plurality of elements that attach to the connecting node.

In accordance with another exemplary embodiment of the invention, a method for manufacturing a connecting node comprises the steps of providing a plurality of panels, joining the plurality of panels to one another at a side edge of each panel to form a spherical approximation, and constructing at least one of the plurality of panels to include a passage for facilitating the integration of at least one of a plurality of elements that may be attached to the connecting node.

Other aspects and advantages of the embodiments described herein will become apparent from the following description and appended claims, taken in conjunction with the accompanying drawings, illustrating the principles of the embodiments by way of example only.

DETAILED DESCRIPTION

Figure 1:
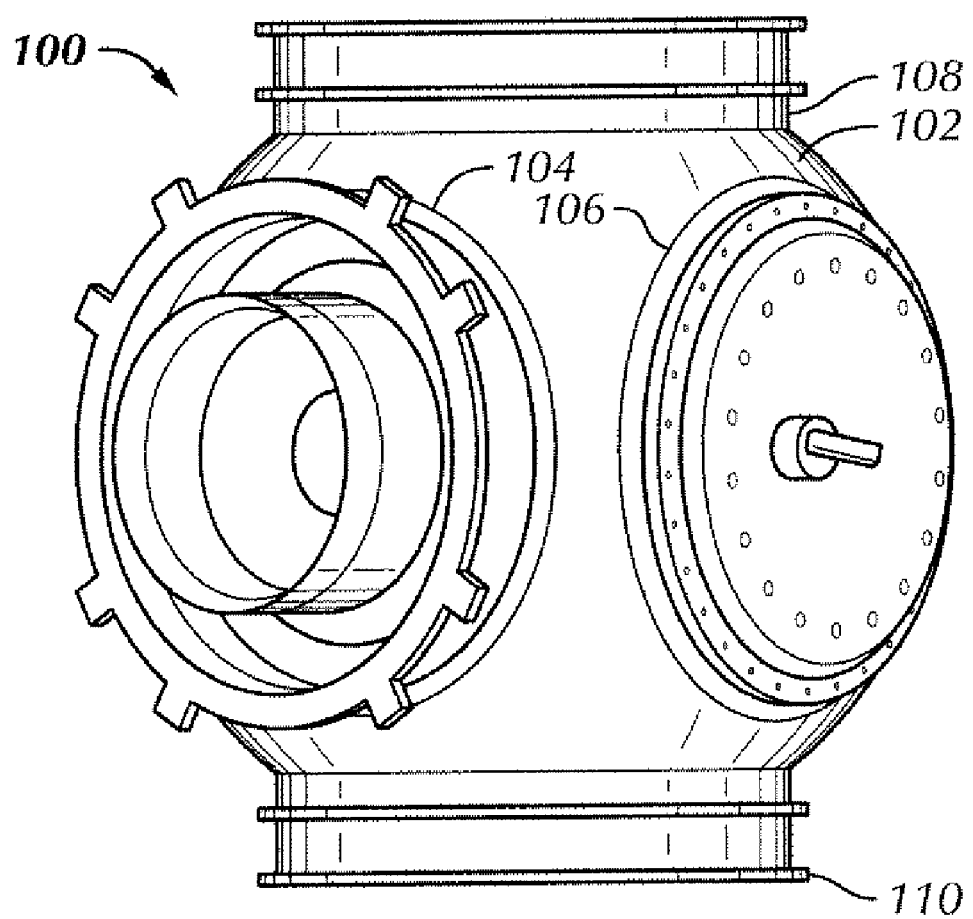
FIG. 1 shows a conventional connecting node of the related art.

Exemplary embodiments of the invention will now be described with reference to the accompanying figures. Like elements or components in the figures are denoted with the same reference characters for consistency.

In the following detailed description, numerous specific details are set forth in order to provide a more thorough understanding of the invention. However, it will be apparent to one of ordinary skill in the art, after having the benefit of this detailed description, that the invention may be practiced without these specific details. In other instances, well-known features have not been described in detail to avoid unnecessarily complicating the description.

Before beginning a detailed description of some exemplary embodiments of the invention, the meaning of certain terms as used herein will be given. "Polyhedron" (or plural "polyhedra" or "polyhedrons") means a three-dimensional geometric object (i.e., a "solid") with a plurality of faces or faceted elements and side edges. A defining characteristic of almost all kinds of polyhedra is that just two faceted elements join along any common side (straight-line) edge. This characteristic ensures that the exterior surface of the polyhedron is continuously connected and does not end abruptly or split off in different directions. "Net" means, in relation to a polyhedron, an arrangement of edge-joined polygons in a plane which can be folded (along its side edges) to become the faces of the corresponding polyhedron. Polyhedral nets are a useful aid to the study of polyhedra and solid geometry in general, as they allow for models of polyhedra to be constructed from material such as thin cardboard. "Inscribed" means, in relation to a geometric object, a geometric object which touches only the sides or interior faces of another geometric object. "Insphere" means a sphere inscribed within a given geometric solid. "Inradius" means the radius of the insphere. "Midsphere" means the sphere with respect to which the vertices of a polyhedron are the inversion poles of the planes of the faces of the "dual polyhedron" (and vice versa). It is also called the "intersphere", "reciprocating sphere", or "inversion sphere." "Midradius" and "interradius" mean the radius of the midsphere of a polyhedron. "Circumsphere" means a sphere circumscribed in a given geometric solid. "Circumradius" means the radius of a circumsphere.

The exemplary embodiments describe a connecting node and a method to construct and use a connecting node. More specifically, the embodiments herein describe a connecting node comprising a plurality of panels joined together at its side edges to form a spherical approximation. In one or more embodiments, at least one of the plurality of panels facilitates the integration of an element selected from the group consisting of docking ports, hatches, windows, and external space systems that may be attached to the connecting node.

Figure 2:
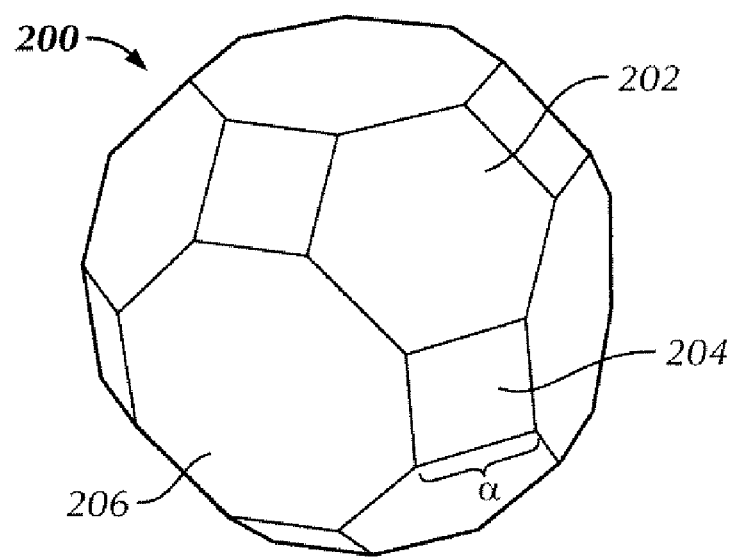
FIG. 2 is a perspective view of a representative sample of a polyhedron that is constructed to form a spherical approximation comprising a plurality of panels in accordance with one or more of the exemplary embodiments.

FIG. 2 is a perspective view of a representative sample of a polyhedron or polyhedral structure 200 that is constructed to form a spherical approximation comprising a plurality of panels. Specifically, the polyhedron 200 is an Archimedean solid known as the great rhombicuboctahedron, but it is also sometimes called the truncated cuboctahedron or the rhombitruncated cuboctahedron. Polyhedron 200 comprises twenty-six (26) faceted polyhedral elements or panels of three polygon shapes: eight (8) hexagon panels 202, six (6) octagon-shaped panels 206, and twelve (12) squares 204. In one or more embodiments, the panels are joined and connected together to create or allow for a connecting node 500 (see FIG. 5) having a pressurized volume within the interior volume of the polyhedron formed to be a spherical approximation.

While FIG. 2 depicts a polyhedron 200 with three different types of 26 polygonal panels, more or less polygonal shapes may be used to construct a connecting node out of a polyhedron from more or less of a plurality (i.e., other than the number 26) of panels in accordance with the exemplary embodiments of the invention. Different polygonal shapes may be selected to comprise the plurality of panels, such as triangular, diamond, pentagon, decagon, and/or rectangular shapes. The polyhedron selected to form a connecting node may take the form of other Archimedean solids, such as a truncated dodecahedron, an icosidodecahedron, or a truncated icosahedron. Further, those skilled in the art will appreciate that while FIG. 2 illustrates that the polyhedron 200 comprises panels or faceted polyhedral elements that are substantially flat or planar, the embodiments herein are not limited to flat panels alone. Rather, some or all of the panels used in the formation of the connecting node may include convex, concave, waved, or other curved surfaces for the panels. Similarly, the side edges formed by the joining of the two panels may be a straight or curved line.

Figure 4:
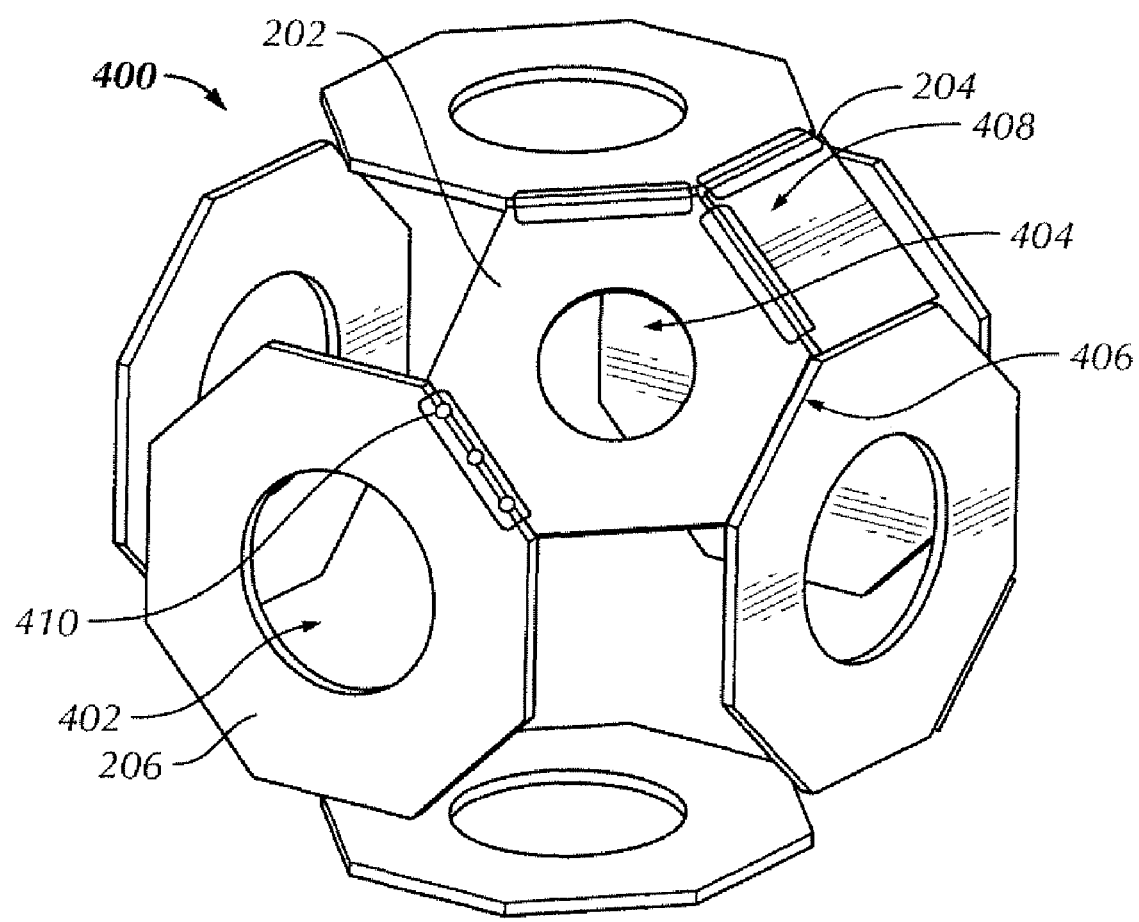
FIG. 4 shows partial construction of a connecting node made in accordance with one or more of the exemplary embodiments.

With reference now to FIGS. 2 and 4, at least one of the panels that have the largest surface area (which are the six octagonal panels 206) may be constructed to include a passage 402 for integrating with an element such as a docking port or hatch. Similarly, at least one of the panels that have the second largest surface area (which are the eight hexagonal panels 202) may be configured to have an opening 404 to integrate with an element such as a window. A window positioned in relation to a hatch as shown in FIG. 4 provides an optimal viewing angle for an occupant within the connecting node 400 so as to see approaching vehicles or other external activity outside the node, such as a space station or other space objects. The panels that have the smallest amount of surface area (which for the exemplary embodiment are the twelve square panels 204) may be designed to be solid along its entire surface but may still be configured to integrate with another element either with its internal or external surface. The specific aforementioned construction, configuration, and/or design of each of the three types of polygonal panels and its corresponding element to which it is integrated therewith are examples only and are not meant to limit the embodiments described herein. In other words, the square-shaped polygonal panels may also be designed to include a passage or opening to integrate with elements such as a window or even a hatch. Alternatively, the hexagonal panels may be designed to have a passage for integrating with a docking port, a hatch, or other external system. The panels of the connecting node enable a variety of elements to be pre-packaged or pre-integrated and then mounted or otherwise attached to the connecting node 400 such that when it is at an intended destination, the elements can, for example, be inflated and/or expanded on-site and already be connected to a solid structure.

The connecting node 400 may be scaled to any desirable size based on the design needs of the node as an airlock or copula. For the polyhedron 200, the length of the side edge of each of the panels of the connecting node is equal to one another. Thus, the length of the side edge may be represented by the symbol $\alpha$ in a set of mathematical equations to determine the surface area and volume of the polyhedron. For instance, under the duality principle, for every polyhedron, there exists another polyhedron in which its faces and polyhedron vertices occupy complementary locations. This polyhedron is known as the dual or reciprocal or dual polyhedron. Given this principle, a mathematical relationship between the insphere, midsphere, and circumsphere and its corresponding dimensional components of the inradius, midradius, and circumradius, respectively, and the length of the side edge may be established as given below, where $\alpha$ is the length of the side edge, $r_d$ is the inradius of the dual polyhedron (corresponding to the insphere, which touches the faces of the metallic solid), $\rho$ is the midradius of both the polyhedron and its dual (corresponding to the midsphere, which touches the edges of both the polyhedron and its duals), and R is the circumradius (corresponding to the circumsphere of the solid which touches the vertices of the solid). Because the circumsphere and insphere are dual to each other, $r_d$, R, and $\rho$ obey the polar relationships to one another, such that:

$$R = \frac{1}{2}\left(r_d + \sqrt{r_d^2 + \alpha^2}\right) = \sqrt{\rho^2 + \frac{1}{4}\alpha^2}$$

$$r_d = \frac{\rho^2}{\sqrt{\rho^2 + \frac{1}{4}\alpha^2}} = \frac{R^2 - \frac{1}{4}\alpha^2}{R}$$

$$\rho = \frac{1}{2}\sqrt{2}\sqrt{r_d^2 + r_d\sqrt{r_d^2 + \alpha^2}} = \sqrt{R^2 - \frac{1}{4}\alpha^2}$$

Further, given this set of mathematical equations, the volume V of the polyhedron may be approximated for the side edge length α as:

$$V=(22+14\times\sqrt{2})\alpha^3$$

and the area A of the polyhedron may be approximated as:

$$A=12(2+\sqrt{2}+\sqrt{3})\alpha^2.$$

Figure 3:
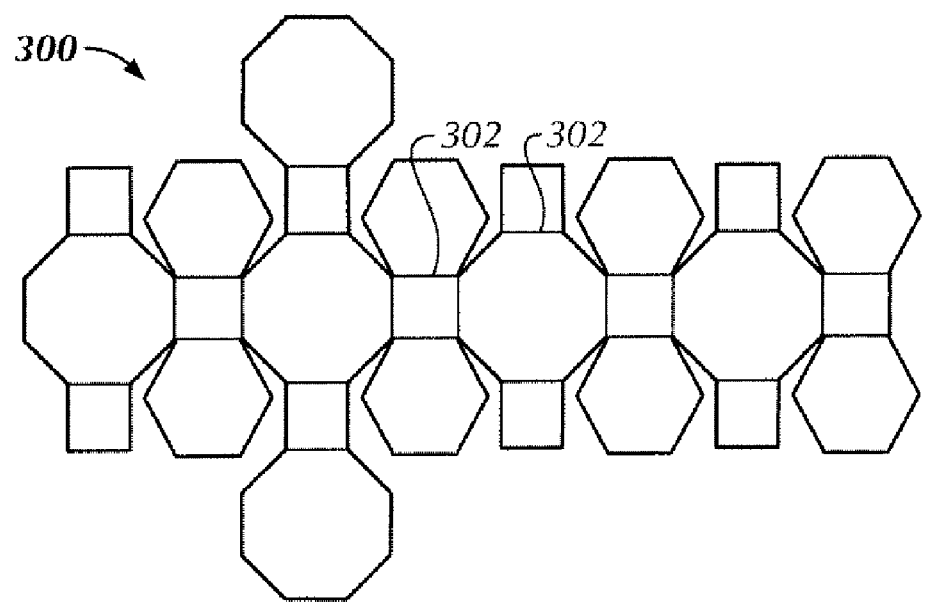
FIG. 3 represents the net of a polyhedron of FIG. 2 that may be constructed to form a connecting node in accordance with one or more of the exemplary embodiments.

FIG. 3 represents the net 300 of the polyhedron (the great rhombicuboctahedron) of FIG. 2. The net 300 shows all of the polygonal panels of the polyhedron as they would appear when disconnected at some of its side edges and then laid upon a flat or planar surface. Net 300 indicates how the connecting node may be partially constructed by providing a plurality of polygonal panels and then connecting a portion of the polygonal panels at its side edges for later ease in completing assembly. For instance, the side edges 302 of the square panels, which are shown as being joined to another side edge of another polygonal panel, may be connected together by a joining means such as a hinge-like connection such that the adjacent panels are rotatably attached to one another. Such panels that are rotatably attached to one another may later be maneuvered and positioned in the appropriate angular relationship with the other unconnected polygonal panels to form a spherical approximation providing an enclosed structure capable of having a pressurized volume for use as an airlock, connecting node, or both.

FIG. 4 shows the partial construction of connecting node 400 in accordance with one or more exemplary embodiments. Each panel may be constructed of metal such as aluminum, copper, brass, steel, etc. Alternatively, panels 202, 204, 206 may be constructed using honeycomb composite panels (e.g., aluminum honeycomb structures) or a pocketed skin-stringer configuration. In one or more embodiments, the panels may be joined or connected together by a variety of methods. For example, if metal is used, the metallic panels may be welded together as shown by weld 406 using welding methods known in the art. In another example, the panels may be connected using an adhesive sealant 408 for bonding the panels together. For this type of joining means, a metallic plate with flanges angled in a manner that accommodates the appropriate angular relationship between the panels once constructed to form a spherical relationship may or may not include built-in seals is placed over the edges of the panels that are joined together. Alternatively, pre-integrated metallic strips may be positioned onto the joints of the connecting node, and each edge of the panel may be connected using, for example, o-ring sealants. Alternatively, another type of sealing method involves the use of a bladder material or membrane that is placed over the joints of the panels and then the joints may be sealed in appropriate locations. Further, in one or more embodiments, the panels may be bolted together using a combination 410 of plates and, for example, bolts, rivets, or other fasteners. If the panels are constructed using honeycomb composite structures, rather than metal, then the interfaces of the composite structures can be joined or connected using the sealant 408, the combination of plates and sealant, or the combination 410 of plates and other fasteners such as bolts or rivets described above. Accordingly, the connecting node 400 may be manufactured without elaborate tooling.

Figure 5:
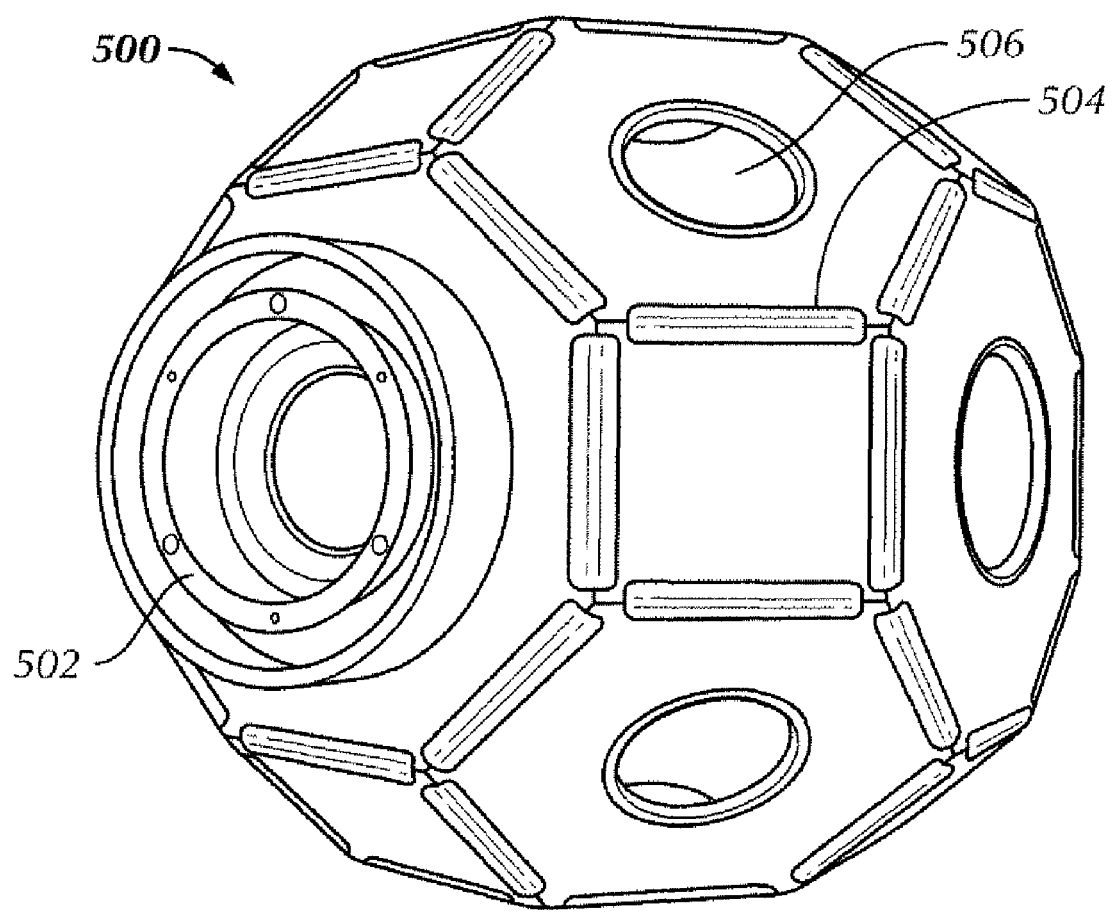
FIG. 5 shows an assembled connecting node having a least one panel constructed to integrate with a docking port and at least one panel configured to integrate with a window in accordance with one or more of the exemplary embodiments.

FIG. 5 shows a connecting node 500 in accordance with the exemplary embodiments. The connecting node 500 comprises at least one panel constructed to include a passage for integration with a docking port 502, at least one panel configured to have an opening for integrating with a window 506, and a plurality of panels that are joined using a joining or connection means 504. Connection means 504 may comprise any of the aforementioned techniques for joining the side edges of the panels, such as a hinge-like structure, welds, adhesive sealants, plates and bolts, etc. Because the docking port 502 protrudes out and away from the outer surface of its integrated panel, other elements can be readily attached to the connecting node 500. Further, the integration of the docking port 502 does not take away from the generally spherical shape of the interior volume of connecting node 500.

In one or more embodiments, the connecting node 500 may be manufactured on the ground and subsequently transported to an intended location, whether in space or on a ground surface. In one or more embodiments, the connecting node may be pre-configured with integrated elements for deployment on-site, with the site being located on the ground, in space, in orbit, on a space system, etc. Once located in its desired position, the pre-configured elements that integrate with the connecting node 500, such as inflatable objects that are pre-packaged and attached to the node when the connecting node is manufactured on the ground, can be deployed. In such a case, the pre-packaged inflatable objects may remain in compact and compressed form until the connecting node 500 reaches the intended destination, at which point the inflatable elements may be expanded into full form. Having the benefit of this detailed description, those skilled in the art will appreciate that pre-configured integrated elements may include any type of external system that may be deployed once the connecting node is located on-site.

The connecting node 500 may be used to integrate all the wiring and plumbing for each of the inflatable elements that may be pre-packaged and integrated to the node. Further, in one or more embodiments, the connecting node 500 may be connected to other elements to allow transfer between elements. In this case, the connecting node 500 may be used as a mechanical hub that includes the necessary wiring and mechanical structures for one or more of the elements that are joined to the connecting node. Alternatively, the connecting node 500 may be used as an airlock and/or a copula.

The exemplary embodiments described herein include a connecting node made of a polyhedral structure comprising a plurality of panels to form a spherical approximation that enables easier integration of elements and subsystems and provides other design features. The method for constructing the connecting node comprises steps that employ easy manufacturing methods to build the polyhedral structure. The polyhedral structure comprising a plurality of panels configured to integrate with other elements enables windows to be positioned on certain panels that provide optimal viewing angles without blockage by large connected modules. Further, when the panels comprises a flat integrating surface, the integrated docking ports, hatches, windows, etc., need not be recessed into the interior volume of the connecting node, but rather can be integrated so as to extend out and away from the exterior surface of the connecting node. Thus, the exterior space systems that are connected to the connecting node can readily make contact with the docking port or hatch while avoiding a need to come into close proximity to the exterior surface of the connecting node. Additionally, the interior volume of the connecting node is would not be adversely affected by the inclusion of docking ports, hatches, windows, etc.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function and step-plus-function clauses are intended to cover the structures or acts described herein as performing the recited function and not only structural equivalents, but also equivalent structures. Thus, while a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A connecting node, comprising:
   a polyhedral structure comprising a plurality of faceted panels configured to be joined together to form a fully-enclosed, sealed spherical approximation, each panel comprising opposing inner and outer planar faces having a polygonal cross-section having peripheral side edges extending at a faceted angle between the inner and outer faces, wherein an edge length associated with each edge of the plurality of panels is equal, wherein each side edge of each of the plurality of faceted panels is abuttingly joined to another side edge of another of the plurality of faceted panels to form a joint, each joint including a seal extending along the entire edge length of the adjoining side edges so as to allow pressurization of an interior volume of the polyhedral structure, at least one of said plurality of faceted panels being constructed to include a passage for integrating with a docking port and at least one other of said plurality of faceted panels being configured to have an opening for integrating with a window;
   at least one docking port, each said at least one docking port being connected to one of said at least one of said plurality of faceted panels including the passage for integrating therewith; and
   at least one window, each said at least one window being connected to one of said at least one other of said plurality of faceted panels having the opening for integrating therewith,
   said at least one window being positioned in proximity to said at least one docking port so as to provide a viewing angle of an element being connected to the connecting node at said at least one docking port.

2. The connecting node of claim 1, wherein the polyhedral structure is an Archimedean solid.

3. The connecting node of claim 1, wherein the polyhedral structure is in the form of a great rhombicuboctahedron Archimedean solid wherein each side edge of each of the plurality of faceted panels is of equal length and wherein the plurality of faceted panels comprises three different types of polygonal shapes consisting of 6 octagonal panels, 8 hexagonal panels, and 12 square panels.

4. The connecting node of claim 3, wherein the window is connected to one of said hexagonal panels and the docking port is connected to one of said octagonal panels.

5. The connecting node of claim 1, wherein each joint includes at least one joining means selected from the group consisting of a weld, an adhesive sealant, a combination of an adhesive sealant and a plate with flanges, a hinged structure, and a combination of a plate affixed with bolts.

6. The connecting node of claim 1, wherein the connecting node is used as one selected from a group consisting of an airlock and a copula.

7. The connecting node of claim 1, wherein the connecting node is used to transfer objects from a first element to a second element, wherein the first and second element are attached to the connecting node.

8. The connecting node of claim 1, wherein the plurality of panels are made of material selected from the group consisting of metallic material, honeycomb composite panels, and a pocketed skin-stringer configuration.

* * * * *